United States Patent
Brunemann

(10) Patent No.: US 7,470,095 B2
(45) Date of Patent: Dec. 30, 2008

(54) MOBILE MILLING HEAD WITH TORQUE MOTOR DRIVE

(75) Inventor: Bernhard Brunemann, Denkendorf (DE)

(73) Assignee: F. Zimmerman GmbH, Denkendorf (DE)

( * ) Notice: Subject to any disclaimer, the term of this patent is extended or adjusted under 35 U.S.C. 154(b) by 0 days.

(21) Appl. No.: 11/519,510

(22) Filed: Sep. 11, 2006

(65) Prior Publication Data

US 2007/0059116 A1    Mar. 15, 2007

(30) Foreign Application Priority Data

Sep. 13, 2005    (DE) .................. 10 2005 043 835

(51) Int. Cl.
B23C 1/12    (2006.01)
(52) U.S. Cl. ...................... 409/201; 409/212
(58) Field of Classification Search .............. 409/201, 409/212, 211, 216, 199; 408/236; 901/23, 901/24, 25, 28; 310/261, 262, 272, 68 B, 310/92, 99, 83, 156.01, 154.01

See application file for complete search history.

(56) References Cited

U.S. PATENT DOCUMENTS

| | | | |
|---|---|---|---|
| 4,761,114 A * | 8/1988 | Barland .................. 414/735 |
| 5,238,340 A * | 8/1993 | Ochiai et al. ............. 409/201 |
| 5,584,621 A * | 12/1996 | Bertsche et al. .......... 409/201 |
| 5,639,191 A * | 6/1997 | Womack ................... 408/1 R |
| 5,718,545 A * | 2/1998 | Husted .................... 409/201 |
| 5,996,329 A * | 12/1999 | Cardenas ................. 409/201 |
| 6,669,416 B2 * | 12/2003 | Klement .................. 409/201 |
| 6,951,440 B2 * | 10/2005 | Piccolo ................... 409/201 |
| 7,293,340 B1 * | 11/2007 | Tsao et al. ............... 409/201 |
| 2004/0150289 A1 * | 8/2004 | James .................... 310/261 |
| 2004/0234352 A1 * | 11/2004 | Vanderpol et al. ........ 409/178 |

FOREIGN PATENT DOCUMENTS

EP    0 885 081 B1    9/2001

* cited by examiner

*Primary Examiner*—Dana Ross
(74) *Attorney, Agent, or Firm*—Emch, Schaffer, Schaub & Porcello, Co., L.P.A.

(57) ABSTRACT

A milling head (16) for a milling machine (1) arranged for machining large-size workpieces comprises a fork 18, which is rotatably arranged around a first axis (C) and demonstrates a pair of fork arms (21, 22), which are separated from one another, a spindle device (23), which is arranged between the fork arms and rotatable around a second axis A, a first torque motor (42), which is coupled to the fork 18 for directly driving and controlling of the rotation of the fork around the first axis (C), and a second torque motor (57) for driving and controlling the rotation of the spindle around the second axis (A), said second torque motor being coupled to the spindle device (23) by means of a one-stage toothed gearing (61), which is mechanically clamped free of backlash. The configuration according to the invention is arranged to achieve high torque with high dynamic stiffness and small interference contour of the milling head (16).

18 Claims, 4 Drawing Sheets

MOBILE MILLING HEAD WITH TORQUE MOTOR DRIVE

BACKGROUND OF THE INVENTION

The present invention relates to a work spindle head for a machine tool spindle, especially a milling head for a milling spindle, comprising torque motors to rotate the spindle around at least two different axes. In addition, the present invention relates to a milling machine which is equipped with this type of milling head and constructed with portal design. Such portal milling machines are frequently used for toolmaking, mold making and model making or production in the automotive, aviation and space industries and in other applications in which complex surfaces must be configured on large tools with extremely high surface quality and processing speed.

SUMMARY OF THE INVENTION

One portal milling machine known in practice demonstrates a portal which is supported on sidestands and can be driven in the X direction by a clamping table solidly fastened to the foundation. An extension arm, which bears a milling head that can be adjusted in the Z direction, is mounted on the portal so that it can move in a Y direction. The milling head itself demonstrates a fork that can rotate around a vertical axis C. The fork forms two fork arms separated from one another between which the spindle housing of a milling spindle is received so that it can swivel around an axis A, which is perpendicular to the C axis. The milling spindle demonstrates a milling tool, which is driven by a motor and projects outwards from the spindle housing and carries out the cutting operations when in operation. The milling tool may thus be positioned into all required angular positions in relation to the workpiece.

The portal milling machine has proven itself in practice. For a moving portal and stationary table, the dynamics of the machine are independent of the weight of the workpiece and the moving masses are relatively small. Precision guide, drive and measuring systems permit high speeds in the linear axis with high positioning accuracy. A servomotor that has a low-backlash gear provides for positioning the milling head on the C axis and on the A axis. In general, a wheel gear or worm gear is used for this.

Some disadvantages are associated with the drive gears, however. For example, a worm gear is subjected to high wear for which there is no compensation. Because of the self-locking effect of the worm gear, there also exists the danger that the milling head or milling tool will be damaged when it bumps against an obstacle. This may be remedied, however, by using a wheel gear without self-locking that is mechanically clamped with low backlash.

Independently of the type of gear used, the stiffness of the machine tool is usually reduced, especially since several reduction stages are frequently needed to achieve the required high torque at the gear output. The reduced stiffness impairs machining accuracy. Furthermore, the assembly and maintenance cost of these types of drive gears are relatively high. In addition, the slew rate is limited. Since modern linear axes can be driven faster and faster with linear motors and rapid corrective movements of the filling head and milling spindle are required when milling complex surfaces in order to always achieve the angular position of the tool needed for the contour of the surface being machined, high rotational and slew rates are required.

Today, drive concepts that can manage without gears are preferably being pursued. For example, EP 885 081 B1 suggests a gearless, direct drive, multiple-axes rotary head for a machine tool spindle. A first servomotor is coupled to the fork of the rotary head and drives it directly in order to rotate it around the C axis. A second servomotor coupled to the spindle drives the spindle directly in order to rotate it around the A axis. Elimination of the gear makes it possible to move the spindle head and spindle into the required angular position at high speeds and to improve tool stiffness. The servomotors that are used can only deliver a limited torque, however, that is not adequate for machining large-size workpieces with a portal milling machine.

Larger torques can be achieved by using a torque motor. Torque motors have meanwhile been replacing conventional drive gears more and more as direct gears for smaller machine tools. They are synchronous motors per se whose geometry has however been specially optimized toward high torque rather than high power output. Torque motors are therefore built relatively large. Accordingly, they would greatly increase the interference contour of the rotary head. This contour should be as small as possible, however, so that the tool can work in a restricted space. Moreover, high-torque torque motors are high in weight, limiting the stiffness and stability of the machine tool.

Proceeding herefrom, it is the object of the invention to eliminate or minimize the unsatisfactoriness of conventional drive concepts. It is furthermore the object of the invention to create a rotary head for a machine tool spindle that is suitable for machining large-size workpieces and that permits a good mode of action with high slewing motion and torque in combination with low construction volume. In particular, it should enable the machine tool to have high stiffness and machining accuracy.

A further object of the invention is to create a portal milling machine for machining large-size workpieces with a rotary head that makes it possible to maintain the required accuracy and stiffness properties.

The rotary head according to the invention demonstrates a fork, which is rotatably arranged around a first axis C and comprises two separated fork arms, and a spindle device, which is held between the fork arms and is mounted so that it can rotate relative to the fork around a second axis A, preferably perpendicular to the axis C. A first drive device, which demonstrates a first torque motor, is coupled to the fork for directly driving and controlling the rotation of the fork around axis C. A second drive device is accommodated within the fork and demonstrates a second torque motor, which serves to drive and control the rotation of the spindle device around the second axis in relation to the fork. However, the second torque motor is not coupled directly to the spindle device but is coupled via a reduction toothed-gear device. The toothed gear added between the torque motor and the spindle device thus transmits the rotational motion of the second torque motor to the spindle device, thereby increasing the torque delivered by the second torque motor to torque values required for the spindle device.

The invention is based on the insight that a special combination of drive concepts that are already known per se and that have been used independently of one another makes it possible to largely eliminate or at least reduce their inadequacies, while better utilizing their specific advantages and properties. The use of torque motors as drive means, for example, builds the foundation for achieving a high torque output in comparison to servomotors, high dynamics and stiffness, low susceptibility to wear and easy assembly and repair. The in-line arrangement of the gear device according to the invention in the A-axis drive train makes it possible to configure the torque motor much smaller than in the case of direct drives, while maintaining the torque at the gear output. This substantially reduces the construction volume and weight of the rotary head. Vice versa, the invention is based on the insight that the approach of using a drive gear for positioning in the A axis, an approach that has meanwhile been abandoned in favor of direct drives, can be further pursued if a torque motor is combined with a reduction toothed gearing, both of which are known per se.

In the sense used here, the expression "torque motor" basically means a servomotor provided for direct drive, the geometry of which is specially conceived within the meaning of high torque or high forces instead of a high power output. The structural shape of torque motors is therefore rather short and with large diameter. These motors also have more poles than conventional servomotors to keep the copper losses and electrical time constants small. They also have sufficiently large thermal time constants. As a result, an extremely high torque can be achieved at very small rotational speeds. In short, the torque output and power output is optimized in these motors instead of efficiency. From the electrical point of view, modern embodiments are three-phase brushless synchronous motors with permanent excitation. Embodiments with external or internal rotors are known. Motor manufacturers offer torque motors separately in addition to conventional servomotors, whereby complete built-in units consisting of rotor, stator, bearings and integrated cooling system can also be obtained.

The torque motors used for the axes of rotation in the invention are preferably each configured in the form of a directly driven pancake motor that demonstrates a stator, which is configured as an external ring and demonstrates three-phase windings, and a rotor, which demonstrates permanent magnets and is configured as an internal ring and is arranged in the interior of and concentric to the stator. But torque motors with an external rotor may also be used.

The first torque motor can advantageously be accommodated in a housing of a machine tool, this housing being separated by the fork and associated with the C axis. The C-axis housing can, for example, be formed by a movable supporting arm or extension arm of a milling machine, especially a portal milling machine, this arm bearing the rotary head that serves as milling head. The supporting arm has adequate space to receive the torque motor. The rotor of the torque motor is arranged rotatable around and concentric to the first axis C. It can also be operationally connected to a shaft or sleeve, which is likewise arranged concentric to the first axis C and connected to the fork in non-rotatable fashion in order to drive the rotation of the sleeve directly. This creates a low-wear and stiff direct drive connection, making possible high torques and rotational speeds and rotational accelerations when positioning the spindle device in the C axis.

The fork of the rotary head preferably demonstrates a basically U-shaped form with a base for securing the rotary head to the rotationally driven sleeve and to the fork arms, which are essentially parallel to one another and freely project from the base. Each fork arm demonstrates a housing which essentially defines a cubic interior space. The second drive device can advantageously be completely accommodated in the interior space of only a single fork arm.

A spindle taper for receiving the work spindle, such as a milling spindle, is arranged between the fork arms. The swivel-mounted spindle taper is preferably arranged to receive different spindles, such as for roughing or for finishing, it being possible to provide means that enable semiautomatic or even fully automatic spindle change. The work spindle can preferably be rotationally driven by its own integrated motor, which is decoupled from the first and second drive device.

According to the invention, the second drive device is formed by the combination of the second torque motor with a simple, although specially configured, reduction toothed gearing. The advantages of the torque motor are thereby largely retained. Very high torques can advantageously be generated by a suitable gear reduction, which must be chosen at least 1:2, preferably at least 1:4 or even larger, a very slenderly built, compact and light torque motor being adequate for this. This permits the creation of a rotary head with small construction volume and small interference contour that is well suited for machining operations in a limited area. The mass of the torque motor and the rotary head can be significantly reduced. Since this mass engages the machine tool far from the bearings, the tendency toward vibrations or oscillating motions during operation is likewise reduced. This builds the foundation for high stiffness and dynamics of the machine and for a high surface quality, even during high rates of feed and rapid load changes. The slew rate of at least 180° per second is adequate for most applications, in spite of the added gear reduction.

It is furthermore advantageous that the toothed gearing according to the invention does not form a self-locking gear. Damage can be largely eliminated or at least reduced when the rotary head bumps against an obstacle. In addition, only a single wheel stage is advantageously provided to efficiently prevent flexibility in the gear or power transmission train.

It is advantageous for the toothed gearing to be mechanically clamped free from backlash in such a manner that there is hardly any flank clearance between the intermeshing gear teeth, and backlash caused by wear is automatically compensated.

A spur gear with helical toothing is used in one preferred embodiment. A pinion is connected to the rotor of the second torque motor in non-rotatable fashion, while a stationary gearwheel which engages the pinion is fastened to the housing of the spindle taper. A device for mechanically clamping the toothed gearing free from backlash reduces backlash caused by tolerance and wear to a minimum.

In one advantageous realization, the gearwheel is configured divided and demonstrates a first and a second spur pinion, which are arranged concentric and axially adjacent to each other. The second spur pinion does not rotate, but is held axially displaceable in relation to the first spur pinion. A clamping device clamps the second spur pinion against the first to provide for clamping free of backlash and automatic wear compensation.

The rotary head is preferably provided for use as milling head for a milling machine, especially a portal milling machine, for the machining of large-size workpieces in toolmaking, mold making and model making. The high dynamic stiffness that can be attained by the thought-out drive technique makes the rotary head according to the invention particularly suitable for high-speed applications with high requirements for machining accuracy, as demanded by the automotive and aviation industry.

In accordance with another aspect of the present invention, there is created a portal milling machine, especially for machining of large-size workpieces, comprising a stationary clamping table which defines an X axis, a portal that can be driven along the X axis, a first feed device for positionally accurate driving of the portal along the X axis, a supporting arm which is mounted on the portal and can preferably be driven in a Y axis, and a milling head, which is fastened to the supporting arm and can preferably be driven in a Z axis, said milling head being configured in the form of the rotary head according to the invention with the features and advantages explained above. The advantages of the milling head according to the invention are also of benefit to a milling machine that is configured highly dynamic but also stiff so that a high surface quality can be achieved even at rapid feed rates and accelerations.

The portal milling machine according to the invention also permits extremely large and heavy workpieces to be completely milled in one piece without requiring regrinding or other refinishing. The portal milling machine can demonstrate a stationary clamping table for the workpiece, said clamping table preferably being solidly anchored to the foundation, and stable sidestands which support the portal. The masses to be moved are then always the same and relatively small. The portal milling machine according to the invention is able, for the sake of an example, to machine steel workpieces with a mass of 15 metric tons in a machine space dimensioned 4×3×1.5 m. The feed devices for the linear axes and the first and second drive device, in combination with appropriate measuring systems and a CNC controller, provide for accurate positioning of the milling head and milling spindle during the machining operation.

Other objects and advantages of the present invention will become apparent to those skilled in the art upon a review of the following detailed description of the preferred embodiments and the accompanying drawings.

BRIEF DESCRIPTION OF THE DRAWINGS

Further details of advantageous embodiments of the invention follow from the drawing, the description and dependent claims. The drawing illustrates an exemplary embodiment of the invention. It shows:

DETAILED DESCRIPTION OF THE INVENTION

Figure 1:
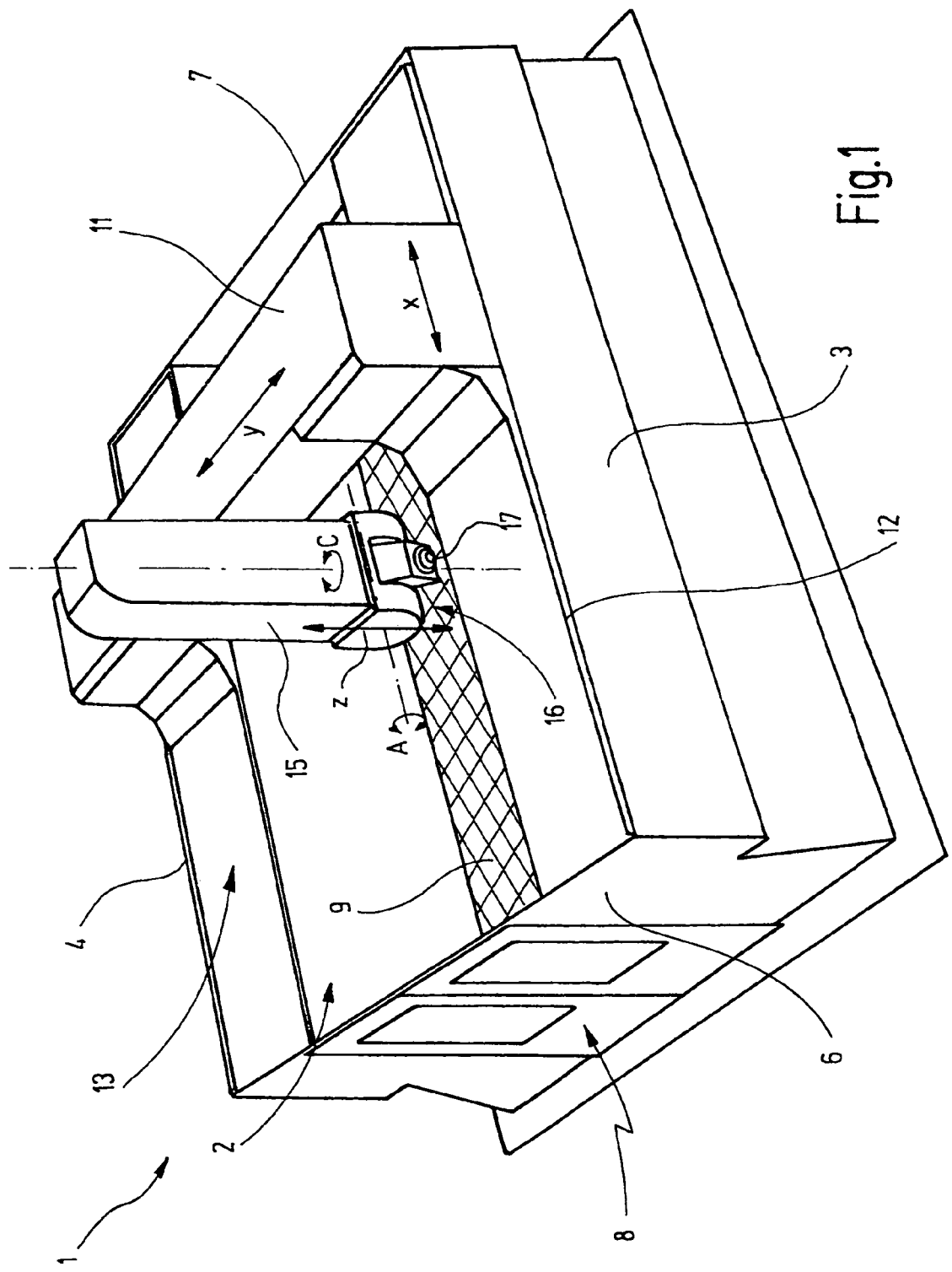
FIG. 1, a portal milling machine according to the invention in a schematic perspective view.

FIG. 1 schematically illustrates a milling machine 1 according to the present invention configured in a portal design. The portal milling machine 1 demonstrates a machine space 2 which is defined by massively configured lateral partition walls 3, 4, a front wall 6 and a rear wall 7 and is accessible through an access door 8 attached to the front wall 6. A machine table 9 for receiving a workpiece is provided in the machine space 2 and is preferably solidly anchored to the foundation. As evident in FIG. 1, the machine space 2 and table 9 are arranged to receive relatively large workpieces, like those used for example in mold or model making in the automotive or aviation industries.

The milling machine is configured in portal design and demonstrates a portal 11, which is supported on the sidestands 3, 4 and can be driven in a horizontal X direction shown by a double arrow and is precisely guided by a guides, which are provided on both sidestands and only implied here. An extension arm 15, which can be moved in the indicated Y direction along the portal 11 by a cross slide, is held to the portal 11 in vertical arrangement. The extension arm 15 comprises a supporting arm 14 (cf. FIG. 3), which bears a milling head 16 with a milling spindle 17. The milling head 16 can be moved in the vertical Z direction by a Z-slide. Drive devices, such as linear motors, guides, the cross slides and Z-slides, associated position measuring systems and controllers, are not explicitly depicted in FIG. 1. They are known per se and not subject matter of the invention.

Two rotational degrees of freedom are also provided for the milling head 16 and milling spindle 17. The milling head 16 can rotate around an axis of rotation C, which runs centrally through the milling head 16 and coincides with the Z axis here. The milling spindle 17 can twist or slew around a horizontal axis A, which is aligned perpendicularly to the C axis. The rotary drives used for this here will be explained in more detail below in connection with FIGS. 3 and 4.

Figure 2:
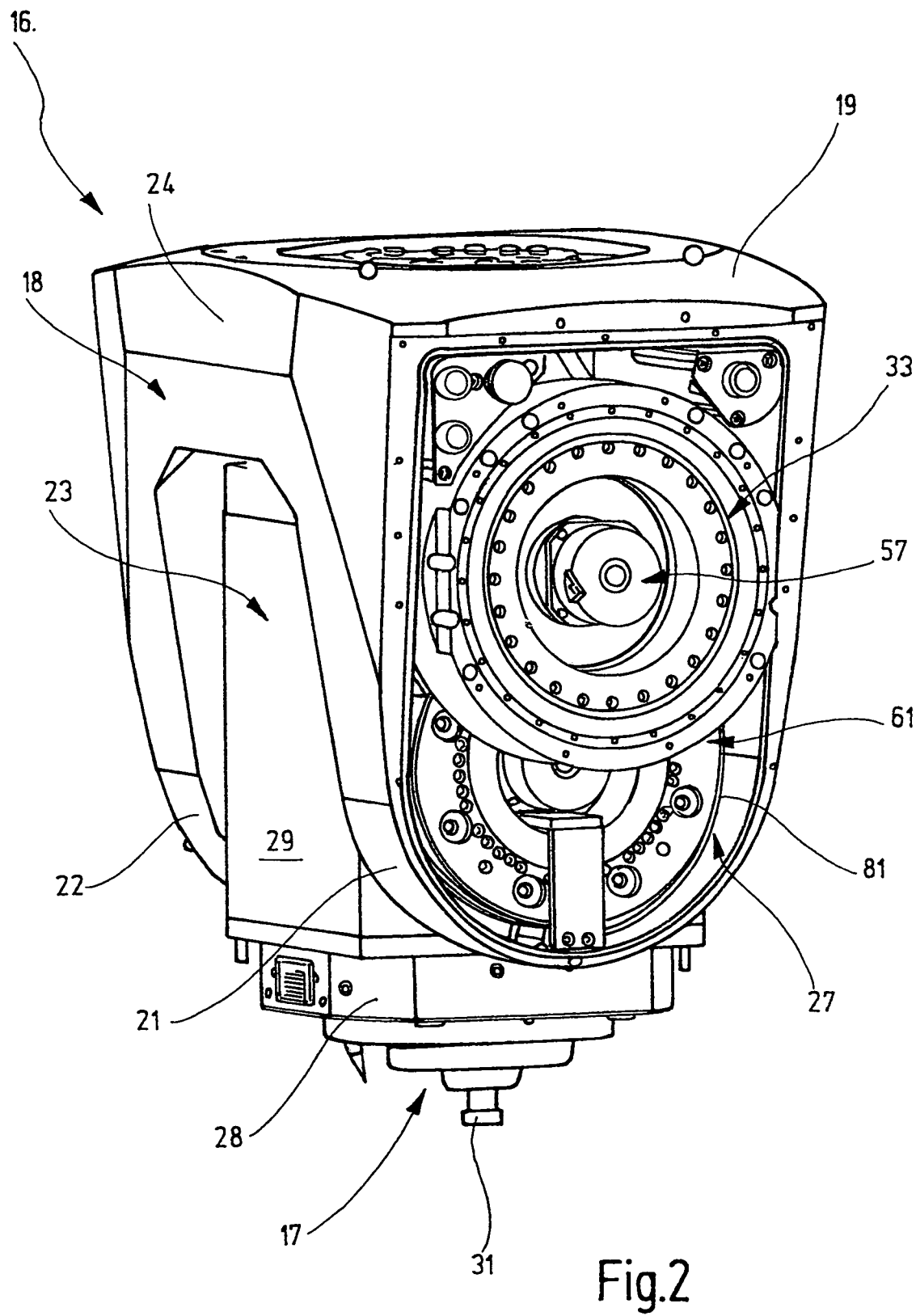
FIG. 2, an enlarged representation of a milling head used in a milling machine according to FIG. 1 in a simplified perspective view.

FIG. 2 depicts the milling head 16 according to the invention in a slightly schematic manner in an enlarged representation without the supporting arm 14. The milling head 16 is basically configured box-like. It demonstrates a fork 18 with a base 19, which serves to fasten the milling head 16 to the supporting arm 14, and fork arms 21, 22, which project away from the base and run at a distance to and parallel to each other, and a spindle device 23 comprising the milling spindle 17. The fork 18 contains a housing 24, which forms interior spaces for accommodating other components of the milling head 16 in the vicinity of the fork arms 21, 22. In FIG. 2, a housing wall 26 has been removed to permit a look into the interior space 27 of the fork arm 21.

The spindle device 23 demonstrates a spindle support 28 with a housing 29, which is received swivel-mounted between the fork arms 21. On the lower end of the spindle support 28 in FIGS. 1 and 2, the milling spindle 17 projects outwards out of the housing 29 with a milling tool 31, which serves for machining a workpiece surface.

Figure 3:
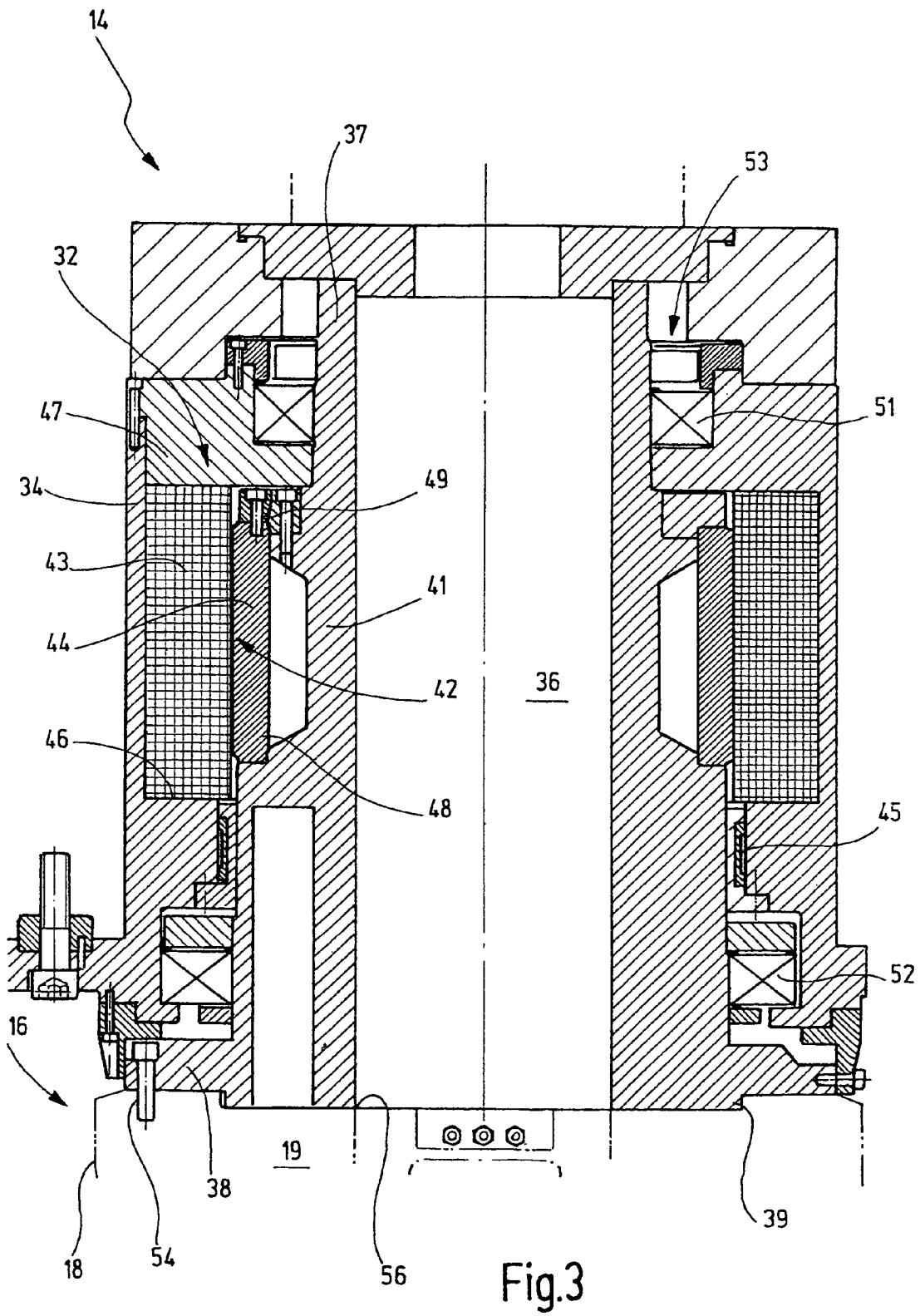
FIG. 3, a cutout of the milling head according to the invention in a schematic cross-sectional view and in another scale.
Figure 4:
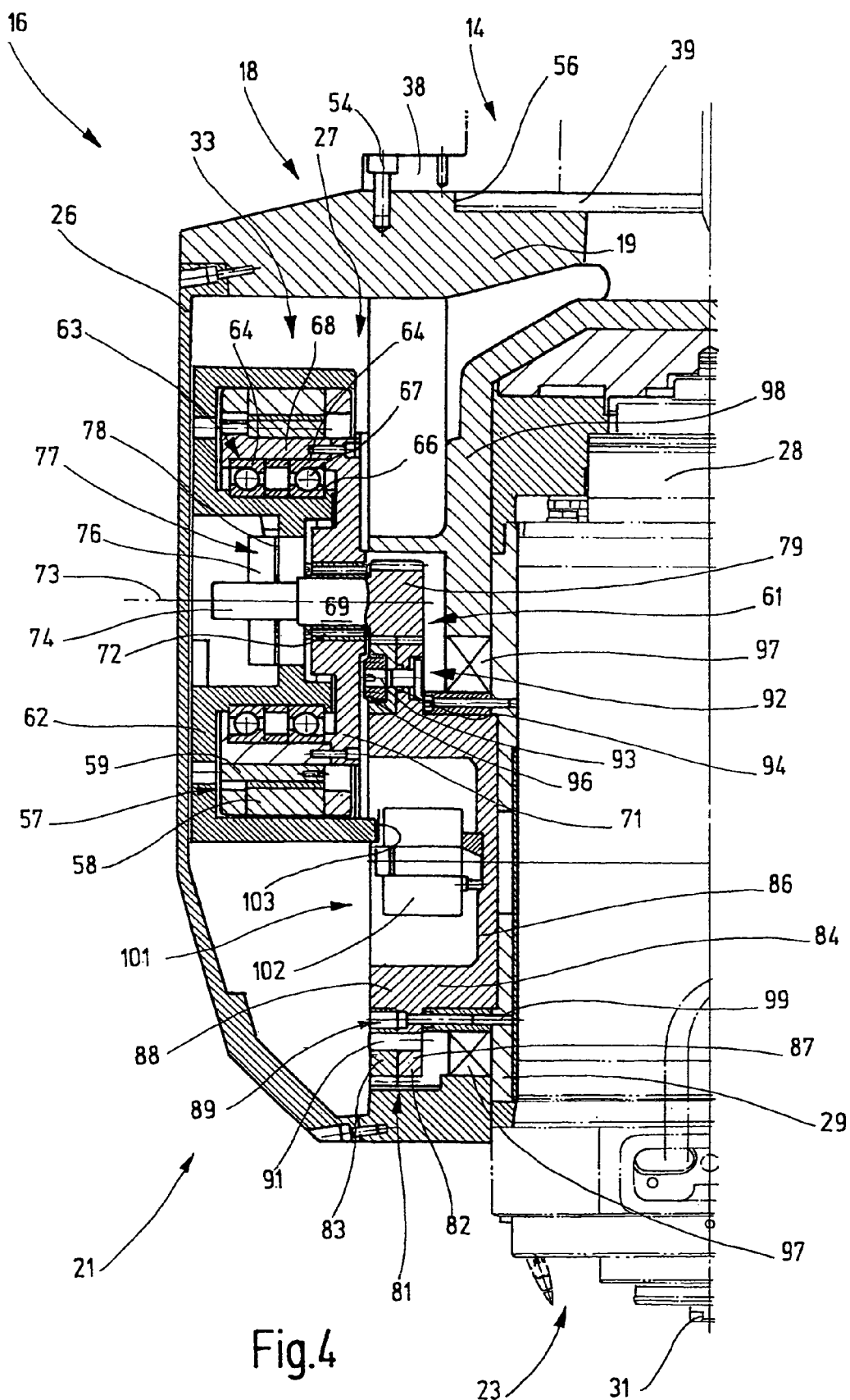
FIG. 4, another cutout of the milling head according to the invention in a simplified, cross-sectional view enlarged relative to FIGS. 1 to 3.

Let us now refer to FIGS. 3 and 4, which illustrate details of the milling head 16 and milling machine 1 according to the invention in simplified representations. FIG. 3 shows a cross-sectional view along a plane, which contains the C axis and in which the supporting arm 14 forming the housing of the C axis is depicted in cutout fashion in order to illustrate a first drive device 32, which serves for twisting the milling head around the C axis. FIG. 4 depicts a corresponding cross section through the milling head 16 for viewing a second drive device 33, which serves for twisting the spindle device 23 around the A axis. Only a half-section with a cut-open fork arm 21 is represented for simplification.

As illustrated in FIG. 3, the supporting arm 14 demonstrates a multipart housing 34 with a basically cylindrical outer surface. The first drive device 32 and a sleeve 37, which is driven by the drive device and runs along the supporting arm 14 and concentric to the C axis, are arranged in the interior space 36 of the housing 34. The sleeve 37 demonstrates a flange 38, which fastens said sleeve to the milling head 16 and in FIG. 3 is configured on the bottom end of said sleeve, and a ring-shaped neck 39 projecting from the fastening flange 38. The exterior side of the sleeve 37 is multiply graduated between its top end and the flange 38 in order, for example, to create, jointly with the housing 34, a space for receiving the first drive device 32 in a central section 41.

The first drive device 32 is arranged for direct drive and control of the rotation of the fork. It is formed by a torque motor, such as a servomotor 42 designed for high torque, basically comprising a ring-shaped stator 43 and a rotor 44, rotatably arranged inside the stator 43. The stator 43 is arranged on a bearing sleeve 46 of the housing 34, secured in position on one end by means of a clamping sleeve 45, which is inserted between the bearing sleeve 46 and sleeve 37, and on the axially opposite side by means of a ring-shaped mounting 47. The rotor 44, which is likewise ring-shaped, is arranged radially opposite the stator 43, forming a small gap, and is attached to the sleeve section 41 in non-rotatable fashion. Here the axial ends of the rotor 44 are received between a collar 48 of the sleeve 37 and a clamping element 49 and fixed by a screwed connection. The longitudinal axes of the stator 43 and the rotor 44 are concentric to the vertical axis C.

The sleeve 37 is mounted for rotation around the axis C by bearing arrangements. A first bearing 51 supports the top region of sleeve 37 against the mounting 47 and above section 41. Another bearing 52 is arranged near the flange 38. The bearings 51, 52 are suitably fixed between the housing 34 and the sleeve 37. In addition, an angle measurement system 53 is provided between a stationary housing part and the rotating sleeve 37 to detect the relative angular position or speed of the sleeve 37 and the milling head 16 fastened thereto and to transmit this position or speed to the controller that controls the positioning of the milling spindle 17.

As follows from FIG. 4, the base 19 of the fork 18 of the milling head 16 is secured to the flange 38 by fastening means, such as bolts 54. In addition, a cylindrical recess 56, which the neck 39 of the sleeve 37 fits with low backlash, is incorporated on the head-end of base 19, so that the milling head 16 can be aligned exactly concentric to the supporting arm 14.

FIG. 4 illustrates the second drive device 33 for driving and controlling the spindle rotation around the axis A. The entire drive device 33 is accommodated in the interior space 27 of the fork arm 21. As drive means, it likewise demonstrates a torque motor 57 comprising an external stator ring 58, which bears the three-phase windings, and an inner rotor ring 59, which is provided with permanent magnets. According to the invention, however, the torque motor 57 is not coupled to the milling spindle 17 as a direct drive motor. Rather, the second drive device 33 contains a gear device 61, which is inserted between the torque motor 57 and the milling spindle 17 for power transmission.

The stator 58 of the torque motor 57 is fastened to a motor bearing housing 62, which is rigidly connected to the housing 34. The rotor 59 is rotatably mounted on the motor bearing housing 62 by means of a ball bearing arrangement 63, which here is formed by two angular contact ball bearings in a row. The ball bearings 63 are arranged one behind the other at a distance and demonstrate inner rings 64 and outer rings 66, which form external and internal raceways on which the balls 67 roll, the balls being held uniformly spaced from one another in the peripheral direction by a cage, for example. The inner rings 64 are connected in non-rotatable fashion to the motor bearing housing 62 and the external rings 66 are connected in non-rotatable fashion to an adapting flange 68, which secures the rotor 59. The adapting flange 68 is connected in non-rotatable fashion to a shaft 69 by means of a shaft-hub connection comprising a hub 71 fastened to the adapting flange 68 and a clamping sleeve 72 inserted between the hub 71 and the shaft 69. The rotor is thus stiffly connected to the shaft 69 by elements 68, 71, 72. The shaft 69 defines a torque motor axis 73, on which the rotor 59 and the stator 58 are concentrically arranged. The axis 73 runs parallel to the swiveling axis A.

A signal transmitter 76 of an angle measurement system 77 is attached to a shaft extension 74 on one side of the shaft 69 in relation to the hub 71. The signal transmitter 76 detects the angular position or angular velocity of the rotor 59 and delivers characteristic signals to the controller for positioning the milling spindle 17. A stationary signal sensor 78 of the angle measurement system 77 is secured on the motor bearing housing 62 a short distance from the signal transmitter 76.

On the opposite side relative to hub 71, the shaft 69 demonstrates an enlarged diameter and a helical toothing in order to form a pinion 79 of the gear device 61. The pinion 79 meshes with a gearwheel 81, which is rotatably mounted above the axis A, the gearwheel being divided here, configured with a first spur pinion 82 and a second spur pinion 83. The first spur pinion 82 demonstrates a tubular section 84, which runs in the axial direction and concentric to the swiveling axis A, a first radial section 86, which extends radially inwards proceeding from an end of the axial section 84 that faces the milling spindle 17, and a shoulder-like radial section 87, which extends outwards from the axial section 84 in the vicinity of the other end 88 of said axial section and bears the helical toothing. A ring-shaped relief 89 is defined between the end 88 and the radial section 87.

The ring-shaped second spur pinion 83, the radial outer surface of which bears a helical toothing that fits the pinion 79 and spur pinion 82, is arranged in the relief 89. The width and height of the second spur pinion 83 corresponds to the dimensions of the section 87, which is arranged behind and concentric to the spur pinion 83. The second spur pinion 83 is mounted so that it cannot rotate relative to the first spur pinion 82, but is axially displaceable. A plurality of bolts 91, which are fastened to the first spur pinion 82 and engage the associated axial bores of the first spur pinion 82 with low backlash, serve for this mounting.

A clamping device 92 clamps the spur pinions 82, 83 axially against each other. Here, a bolt pin 93, which passes through the spur pinions 82, 83 with low backlash in the axial direction, and a spring 94 form a clamping device 92. The bolt pin 93 demonstrates an enlarged head 96, which presses against the second spur pinion 83, whereas the spring 94 is fastened to the opposite end of the bolt pin 93 and is supported against the first spur pinion 82. A plurality of these types of arrangements of bolt pin 93 and spring 94 are preferably distributed around the perimeter to form a clamping mechanism that mechanically clamps the single-stage toothed gearing 61 uniformly and free from backlash. In addition, the clamping mechanism simultaneously forms an automatic adjusting device, which automatically compensates for backlashes caused by manufacturing tolerances or wear. If, for example, the tooth thickness on the tooth flanks declines as a result of wear, the clamping device 92 pushes the second spur pinion 83 toward the first spur pinion 82 by means of the guide pins 91. This displaces the helical toothings slightly toward each other in the peripheral direction and correspondingly increases the effective thickness between the front flank of one of the spur pinions 82 or 83 and the rear flank of the other spur pinion. This automatically eliminates flank backlashes.

For the bearing arrangement of the gearwheel 81, there is provided a bearing 97, which is effectively inserted between the axial section 84 and a housing section 98 of the fork arm 21. Fastening means 99 connect the housing 29 of the spindle taper 28 to the spur pinion 82 in non-rotatable fashion, so that the milling spindle 17 is held swivel-mounted above the axis A. Another angle measurement system 101, comprising a rotating signal transmitter 102 fastened to the radial section 86 and a stationary signal sensor 103 fastened, for example, to the motor bearing housing 62, is arranged in the interior of the angular section 84 of spur pinion 82. The second angle measurement system 101 supplies the control device with signals, which identify the angular position of the gearwheel 81 and thus the milling spindle 17 above the swiveling axis A.

The milling head 16 according to the invention demonstrates other devices and means, such as supply lines for supplying cooling air or a cooling liquid for the torque motors 42, 57, and for supplying a lubricant and/or for supplying a cooling medium, which cools the milling tool 31 when machining the workpiece surface. These types of devices and means are omitted in the figures for the sake of better visibility and are not essential per se for the invention. It should be noted, however, that the compact construction, which is obtained by the combination of the second torque motor 57 with the one-stage wheel gear 61, permits better accommodation of these types of means in a very limited space within the fork 18.

The milling machine 1 according to the invention so far described, comprising the milling head 16 according to the invention, is arranged for simultaneous 5-axis machining of workpiece surfaces with high surface quality and is especially suitable for machining large-size workpieces in the automotive, aviation and space industries. It works as follows:

In operation, a workpiece is placed on the machine table 9. Since the table 9 and the workpiece cannot be moved, it is possible to machine very large and heavy workpieces made of different materials. The moving masses, which basically include the portal 11, the supporting arm 14 and the milling head 16, always stay the same and are relatively small. The entire machine structure, such as the massive, stationary sidestands 3, 4, the structurally stiff portal 11, etc., is configured for high dynamics and high stiffness, so that even very rapid forward feeds and high load change cause hardly any shaking or vibrations. The drives that are used are also arranged for high dynamic stiffness in order to enable high forward feeds and axial accelerations up to 5 m/s$^2$ or even more. This makes it possible to mill even complex surfaces with very good quality within a short time.

In operation, a numerical controller, which is not illustrated here in detail, of milling machine 1 activates the drives associated with the linear axes X, Y and Z to transport the milling head in the machine space 2 into the position suitable for milling. In addition, the controller simultaneously activates the torque motors 42, 57 and effects rotation of the rotors 44, 59, thereby effecting a controlled rotation of the spindle device 23, which is coupled to the rotors, around the axes C and A. The milling tool 31 can therefore be held below the required angle in relation to the surface to be machined, even at high forward feeds and cutting speeds. During abrupt changes in the linear axis or contour of the surface being machined, it is possible to make rapid corrective movements of the axes of rotation C and A, while maintaining the required angular position. The torque motor 42 coupled with the milling head 16 acts as a direct drive, ensuring rapid acceleration and braking of the milling head 16 around the first axis C. The second drive device 33, namely the torque motor 57 in combination with the one-stage toothed gearing 61, provides for adequate speed and dynamics when the milling spindle 17 swivels around the second axis A. The combination of the two angle measurement systems 77 and 101 advantageously makes it possible to position the spindle device 23 into the exact position on the A axis, even if there is some backlash in the drive train.

The essential advantage of the configuration according to the invention over a direct drive for position in the A axis consists of the fact that it is possible to use torque motors of significantly smaller construction to convey the high torque required for the present applications to the spindle. For the chosen gear reduction of 1:6, as illustrated in FIG. 4, and a torque motor that delivers an output torque of 220 Nm, a torque of 1320 Nm is available at the gear output. Larger reductions are also possible. Since the diameter of torque motors increases over-proportionally as the maximum torque increases, the configuration according to the invention can achieve a substantially smaller protruding length and interference contour of the milling head 16. Milling of very fine contours in a narrow space is thereby made possible. Even the weight of the torque motor 57 and the milling head 16 can be substantially reduced, thereby substantially reducing the tendency to vibrate.

According to the invention, a one-stage, toothed gearing 61, mechanically clamped free of backlash, is selectively used since it may be configured very robustly and low-maintenance. High safety, efficiency and lifetime of the milling machine 1 can thereby be achieved. In addition, the toothed gearing 61 can prevent damage to the milling machine 1 in the event of a bump against an obstacle.

Selective measures, such as the provision of only a single wheel stage, its clamping mechanically free of backlash, structural configuration of the elements, low construction volume and weight of the milling head, provide the basis for high dynamic stiffness and machining accuracy of the milling machine 1.

Numerous variations and modifications of the embodiment described above are possible within the context of the invention. As already mentioned, the gear reduction can be adapted to the respective application and requirements.

The pinion 79 could be fastened to the torque motor 69 as a separate part. The gearwheel 81 and the clamping mechanism 91-96 can be realized in another manner, such as with a plurality of gearwheels clamped against each other. The embodiments illustrated here are preferred on the basis of simple and robust construction. In addition, the embodiment described here can of course be expanded to enable the milling spindle 17 to additionally rotate or swivel around a third axis orthogonal to the axes A and C in the manner of a Cardan construction. A third axis of rotation is not needed for the present applications, however.

It is self understood that no restriction is intended or undertaken in regard to the special device explained here. Rather, the enclosed claims are supposed to comprise all modifications as they fall into the scope of the claims.

A milling head 16 for a milling machine 1 arranged for machining large-size workpieces comprises a fork 18, which is rotatably arranged around a first axis C and demonstrates a pair of fork arms 21, 22, which are separated from one another, a spindle device 23, which is arranged between the fork arms and rotatable around a second axis A, a first torque motor 42, which is coupled to the fork 18 for directly driving and controlling of the rotation of the fork around the first axis C, and a second torque motor 57 for driving and controlling the rotation of the spindle around the second axis A, said second torque motor being coupled to the spindle device 23 by means of a one-stage toothed gearing 61, which is mechanically clamped free of backlash. The configuration according to the invention is arranged to achieve high torque with high dynamic stiffness and small interference contour of the milling head 16.

I claim:

1. Rotary head for a milling machine spindle, comprising
a fork (18), mounted for rotation around a first axis (C) and having two fork arms (21, 22),
a spindle device (23), mounted between said fork arms (21, 22) around a second axis (A), for rotation and rotatable relative to said fork (18),
a first drive device (32), comprising a first torque motor (42), coupled to said fork (18) for directly driving and controlling of the rotation of the fork (18) around the first axis (C), and a second drive device (33), mounted in said fork (18) and having a second torque motor (57) for driving and controlling the rotation of the spindle device (23) around the second axis (A) and a reduction gear device (61), positioned between said torque motor (57) and the spindle device (23) for transmitting the rotational motion of the second torque motor (57) to the spindle device (23) to thereby increase the torque delivered by the second torque motor (57) to torque values required for the spindle device (23), said second drive device being completely positioned within one of said fork arms.

2. Rotary head according to claim 1, characterized in that the fork (18) is fastened to a movable supporting arm (14), which demonstrates a housing (34) into which there are accommodated the first drive device (32) and a rotatably drivable sleeve (37), which is operationally connected to the first drive device, arranged concentric to the first axis of rotation (C) and connected to the fork (18) in non-rotatable fashion.

3. Rotary head according to claim 1, characterized in that the first torque motor (42) is configured in the form of a directly driven pancake motor, which includes a stator (43) provided with a three-phase winding, and a rotor (44), provided with permanent magnets positioned in the interior of the stator (43) and rotatable around and concentric to the first axis (C), said rotor being coupled to the fork (18) in non-rotatable fashion.

4. Rotary head according to claim 1, characterized in that the fork (18) is U-shaped with (i) a base (19) for securing the fork (18) to a sleeve (37) rotationally driven by the first drive device (32), and (ii) fork arms (21,22) extending from the base, and essentially parallel to one another.

5. Rotary head according to claim 1, characterized in that the spindle device (23) is swivel-mounted between the fork arms (21, 22) and is adapted to receive a machine tool spindle (17).

6. Rotary head according to claim 5, characterized in that the spindle device (23) further supports a spindle (17) which is rotatably driven by a dedicated motor.

7. Rotary head according to claim 1, characterized in that the second torque motor (57) motor is configured in the form of a pancake motor having a stator (58) provided with three-phase windings, and a rotor (59) provided with permanent magnets and arranged rotatable around and concentric to a torque motor axis (73) parallel to the second axis (A), said rotor being connected in non-rotatable fashion to a shaft (69) secured to a drive member (79) of the gear device (61).

8. Rotary head according to claim 1, characterized in that the gear device (61) including a gear with a reduction of at least 1:2.

9. Rotary head according to claim 1, characterized in that said reduction gear device (61) forms a non-self-locking gear.

10. Rotary head according to claim 1, characterized in that said reduction gear device (61) is formed by a one-stage gear.

11. Rotary head according to claim 1, characterized in that said reduction gear device (61) is mechanically clamped.

12. Rotary head according to claim 11, characterized in that the gear device (61) includes a clamping and adjusting device (91, 92) for mechanical clamping of the toothed gearing free from backlash and automatic compensation of backlashes.

13. Rotary head according to claim 1, characterized in that the gear device (61) includes a pinion (79), which is connected to a rotor (59) of the second torque motor (57) in non-rotatable fashion, and a gearwheel (81), which meshingly engages the pinion (79).

14. Rotary head according to claim 13, characterized in that the gearwheel (81) is divided and includes a first spur pinion (82) and a second spur pinion (83) arranged concentric to one another and one behind the other and have matching helical teeth engageable with the pinion (79).

15. Rotary head according to claim 14, characterized in that the second spur pinion (83) is arranged in a non-rotatable fashion and axially displaceable in relation to the first spur pinion (82) and is clamped towards the first spur pinion (82) by a clamping device (92).

16. Rotary head according to claim 14, characterized in that the first spur pinion (82) is connected in non-rotatable fashion to a housing (29) of a spindle support (28) having a machine tool spindle (17) fastened thereto.

17. Rotary head according to claim 1, characterized in that the second axis (A) is aligned orthogonal to the first axis (C).

18. Rotary head for a milling machine spindle, comprising a fork (18), mounted for rotation around a first axis (C) and having two fork arms (21, 22), a spindle device (23), mounted between said fork arms (21, 22) for rotation around a second axis (A), and rotatable relative to said fork (18), a first drive device (32), comprising a first torque motor (42),coupled to said fork (18) for directly driving and controlling of the rotation of the fork (18) around the first axis (C), and a second drive device (33), mounted in said fork (18) and having a second torque motor (57) for driving and controlling the rotation of the spindle device (23) around the second axis (A) and a reduction gear device (61), positioned between said torque motor (57) and the spindle device (23) for transmitting the rotational motion of the second torque motor (57) to the spindle device (23) to thereby increase the torque delivered by the second torque motor (57) to torque values required for the spindle device (23) characterized in that said reduction gear device (61) includes a pinion (79) rotatably coupled to said second torque motor (57) and a gearwheel (81) which mashes with the pinion (79), said pinion (79) being disposed inward of said second torque motor (57) toward said first axis (C) and said gearwheel (81) is rotatably mounted above the second axis (A) and disposed inward of the second torque motor (57) and below the pinion (79).

* * * * *